US00RE40726E

(19) United States
(12) Reissued Patent
Fullerton et al.

(10) Patent Number: US RE40,726 E
(45) Date of Reissued Patent: Jun. 9, 2009

(54) PATTERNED MAGNETIC RECORDING MEDIA WITH DISCRETE MAGNETIC REGIONS SEPARATED BY REGIONS OF ANTIFERROMAGNETICALLY COUPLED FILMS

(75) Inventors: Eric Edward Fullerton, Morgan Hill, CA (US); Bruce David Terris, Sunnyvale, CA (US); Dieter Klaus Weller, San Jose, CA (US)

(73) Assignee: Hitachi Global Storage Technologies Netherlands, B.V., Amsterdam (NL)

(21) Appl. No.: 10/630,818

(22) Filed: Jul. 29, 2003

Related U.S. Patent Documents

Reissue of:
(64) Patent No.: 6,391,430
Issued: May 21, 2002
Appl. No.: 09/602,609
Filed: Jun. 21, 2000

(51) Int. Cl.
*G11B 5/66* (2006.01)

(52) U.S. Cl. ..... 428/828
(58) Field of Classification Search ..... None
See application file for complete search history.

(56) References Cited

U.S. PATENT DOCUMENTS

| | | | | | |
|---|---|---|---|---|---|
| 5,408,377 | A | * | 4/1995 | Gurney et al. | 360/325 |
| 5,465,185 | A | * | 11/1995 | Heim et al. | 360/324.11 |
| 5,587,223 | A | * | 12/1996 | White | 428/195.1 |
| 5,768,075 | A | * | 6/1998 | Bar-Gadda | 360/135 |
| 5,820,769 | A | * | 10/1998 | Chou | 216/22 |
| 6,280,813 | B1 | * | 8/2001 | Carey et al. | 428/828 |
| 6,770,386 | B1 | | 8/2004 | Hara et al. | 428/694 |

FOREIGN PATENT DOCUMENTS

EP 1081687 A2 3/2001

OTHER PUBLICATIONS

Chappert et al., "Planar Patterned Magnetic Media Obtained by Ion Irradiation", www.sciencemag.org–Science, vol. 280, Jun. 1988, pp. 1919–1922.*
Terris et al., :Ion–Bean Patterning of Magnetic Films Using Stencil Masks, Appl Phys Lett, vol. 75, No. 3, Jul. 1999, pp. 403–405.*
Abarra et al., "Longitudinal Magnetic Recording Media with Thermal Stabilization", Program of the 2000 IEEE International Magnetics Conference, Apr. 9–13, 2000, p. AA–06.*
Toigo, "Avoiding a Data Crunch", Scientific American,May 2000, pp. 58–61, 64–67, 70–74.*
* cited by examiner

*Primary Examiner*—Holly Rickman
(74) *Attorney, Agent, or Firm*—Duft Bornsen & Fishman LLP

(57) ABSTRACT

A magnetic recording disk is patterned into discrete magnetic and nonmagnetic regions with the magnetic regions serving as the magnetic recording data bits. The magnetic recording layer comprises two ferromagnetic films separated by a nonferromagnetic spacer film. The spacer film material composition and thickness is selected such that the first and second ferromagnetic films are antiferromagnetically coupled across the spacer film. After this magnetic recording layer has been formed on the disk substrate, ions are irradiated onto it through a patterned mask. The ions disrupt the spacer film and thereby destroy the antiferromagnetic coupling between the two ferromagnetic films. As a result, in the regions of the magnetic recording layer that are ion-irradiated the first and second ferromagnetic films are essentially ferromagnetically coupled so that the magnetic moments from the ferromagnetic films are parallel and produce a magnetic moment that is essentially the sum of the moments from the two films. In the non-irradiated regions of the magnetic recording layer, the first and second ferromagnetic films remain antiferromagnetically coupled so that their magnetic moments are oriented antiparallel. The composition and thicknesses of the first and second ferromagnetic films are selected such that essentially no magnetic field is detectable at a predetermined distance above the magnetic recording layer corresponding to the height that the magnetic recording head would be located.

16 Claims, 4 Drawing Sheets

PATTERNED MAGNETIC RECORDING MEDIA WITH DISCRETE MAGNETIC REGIONS SEPARATED BY REGIONS OF ANTIFERROMAGNETICALLY COUPLED FILMS

Matter enclosed in heavy brackets [ ] appears in the original patent but forms no part of this reissue specification; matter printed in italics indicates the additions made by reissue.

TECHNICAL FIELD

This invention relates generally to magnetic recording media, and more particularly to patterned magnetic recording disks with discrete magnetic regions.

BACKGROUND OF THE INVENTION

Conventional magnetic recording media, such as the magnetic recording disks in hard disk drives, typically use a granular ferromagnetic layer, such as a sputter-deposited cobalt-platinum (CoPt) alloy, as the recording medium. Each magnetized domain in the magnetic layer is comprised of many small magnetic grains. The transitions between magnetized domains represent the "bits" of the recorded data. IBM's U.S. Pat. Nos. 4,789,598 and 5,523,173 describe this type of conventional rigid magnetic recording disk.

The challenge of producing continuous granular films as magnetic media will grow with the trend toward higher areal storage densities. Reducing the size of the magnetic bits while maintaining a satisfactory signal-to-noise ratio, for example, requires decreasing the size of the grains. Unfortunately, significantly reducing the size of weakly magnetically coupled magnetic grains will make their magnetization unstable at normal operating temperature. To postpone the arrival of this fundamental "superparamagnetic" limit and to avert other difficulties associated with extending continuous granular media, there has been renewed interest in patterned magnetic media.

With patterned media, the continuous granular magnetic film that covers the disk substrate is replaced by an array of spatially separated discrete magnetic regions or islands, each of which serves as a single magnetic bit. The primary approach for producing patterned media has been the use of lithographic processes to selectively deposit or remove magnetic material from a magnetic layer on the substrate so that magnetic regions are isolated from one another and surrounded by areas of nonmagnetic material. Examples of patterned magnetic media made with these types of lithographic processes are described in U.S. Pat. Nos. 5,587,223; 5,768,075 and 5,820,769.

From a manufacturing perspective, an undesirable aspect of the process for patterning media that requires the deposition or removal of material is that it requires potentially disruptive processing with the magnetic media in place. Processes required for the effective removal of resists and for the reliable lift-off of fine metal features over large areas can damage the material left behind and therefore lower production yields. Also, these processes must leave a surface that is clean enough so that the magnetic read/write head supported on the air-bearing slider of the disk drive can fly over the disk surface at very low flying heights, typically below 30 nanometers (nm).

An ion-irradiation patterning technique that avoids the selective deposition or removal of magnetic material, but uses a special type of perpendicular magnetic recording media, is described by Chappert et al, in "Planar patterned magnetic media obtained by ion irradiation", Science, Vol. 280, Jun. 19, 1998, pp. 1919–1922. In this technique Pt—Co—Pt multilayer sandwiches which exhibit perpendicular magnetocrystalline anisotropy are irradiated with ions through a lithographically patterned mask. The ions mix the Co and Pt atoms at the layer interfaces and reorient the easy axis of magnetization to be in-plane so that the irradiated regions no longer have perpendicular magnetocrytalline anisotropy.

IBM's application Ser. No. 09/350,803, filed Jul. 9, 1999, now U.S. Pat. No. 6,331,364, describes an ion-irradiated patterned disk that uses a continuous magnetic film of a chemically-ordered Co (or Fe) and Pt (or Pd) alloy with a tetragonal crystalline structure. The ions cause disordering in the film and produce regions in the film that are low coercivity or magnetically "soft" and have no magnetocrystalline anisotropy.

A potential disadvantage of the Chappert et al. and IBM ion-irradiated patterned disks is that the regions separating the discrete magnetic regions from one another are not completely nonmagnetic, but sill have some magnetic properties. Thus the magnetoresistive read head in the disk drive will detect noise and/or some type of signal from these regions. In addition, these ion irradiation techniques require the use of a mask that is difficult to fabricate because the holes in the mask are used to generate corresponding nonmagnetic regions on the disk, whereas it is desirable to use a mask that has the same hole pattern as the resulting magnetic bits on the disk.

What is needed is a patterned magnetic recording disk that has discrete magnetic regions separated by completely nonmagnetic regions so that only the magnetic regions contribute to the read signal, and that is made by a patterning technique where the mask pattern of holes matches the pattern of discrete magnetic regions of the disk.

SUMMARY OF THE INVENTION

The present invention is a magnetic recording disk that is patterned into discrete magnetic and nonmagnetic regions with the magnetic regions serving as the magnetic recording data bits. The magnetic recording layer comprises two ferromagnetic films separated by a nonferromagnetic spacer film. The spacer film material composition and thickness is selected such that the first and second ferromagnetic films are antiferromagnetically coupled across the spacer film. After this magnetic recording layer has been formed on the disk substrate, ions are irradiated onto it through a patterned mask. The ions disrupt the spacer film and thereby destroy the antiferromagnetic coupling between the two ferromagnetic films. As a result, in the regions of the magnetic recording layer that are ion-irradiated the first and second ferromagnetic films are essentially ferromagnetically coupled so that the magnetic moments from the ferromagnetic films are parallel and produce a magnetic moment that is essentially the sum of the moments from the two films. In the non-irradiated regions of the magnetic recording layer, the first and second ferromagnetic films remain antiferromagnetically coupled so that their magnetic moments are oriented antiparallel. The composition and thicknesses of the first and second ferromagnetic films are selected such that essentially no magnetic field is detectable at a predetermined distance above the magnetic recording layer corresponding to the height that the magnetic recording head would be located For a fuller understanding of the nature and advantages of the present invention, reference should be made to the following detailed description taken together with the accompanying figures.

DETAILED DESCRIPTION OF THE INVENTION

Preferred Embodiments

Figure 1:
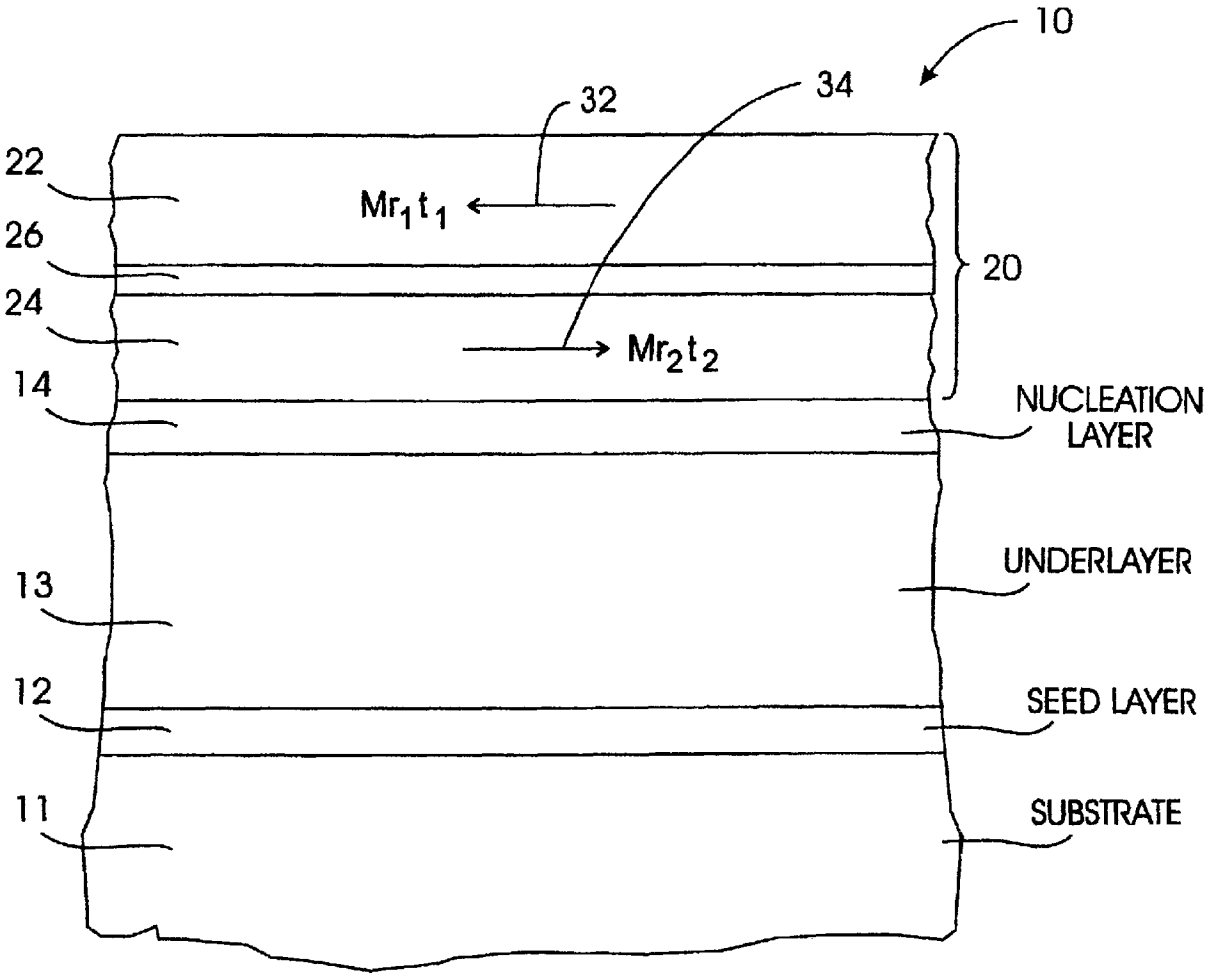
FIG. 1 is a schematic sectional view of the magnetic recording disk showing the antiferromagnetically (AF) coupled layer prior to patterning.

The magnetic recording medium of the present invention is made by first forming a continuous (non-patterned) magnetic layer of two or more ferromagnetic films that are exchange-coupled antiferromagnetically (AF) to their neighboring ferromagnetic films by one or more nonferromagnetic spacer films. FIG. 1 illustrates the cross sectional layer structure of the disk 10 with the AF-coupled magnetic layer 20 prior to patterning.

The disk substrate 11 may be made or any suitable material, such s glass, SiC/Si, ceramic, quartz, or an AlMg alloy base with a NiP surface coating. The seed layer 12 is an optional layer that may be used to improve the growth of the underlayer 13. The seed layer 12 is most commonly used when the substrate 11 is nonmetallic, such as glass. The seed layer 12 has a thickness in the range of approximately 0.5 to 5 nm and is one of the materials, such as Ta, CrTi or NiAl, which are known in the prior art to be useful as seed materials for promoting the growth of subsequently deposited layers in certain preferred crystalline orientations. The underlayer 13 is deposited onto the seed layer, if present, or otherwise directly onto the substrate 11, and is a nonmagnetic material such as chromium or a chromium alloy, such as CrV or CrTi. The underlayer 13 has a thickness in the range of 5 to 1000 nm with a typical value being approximately 50 nm.

The AF-coupled magnetic layer 20 is made up of two ferromagnetic films 22, 24 separated by a nonferromagnetic spacer film 26. The nonferromagnetic spacer film 26 thickness and composition are chosen so that the magnetic moments 32, 34 of adjacent films 22, 24, respectively, are AF-coupled through the nonferromagnetic spacer film 26 and are antiparallel in zero applied field. In the preferred embodiment the two AF-coupled films 22, 24 of layer 20 have magnetic moments that are oriented antiparallel with the lower film 24 having a larger moment so that the net magnetic field from the AF-coupled layer 20 is close to zero at the recording head located above the disk. Each of the ferromagnetic films 22, 24 is preferably a Co alloy, such as a CoPtCrB alloy with 4 to 20 atomic percent (at. %) platinum, 10 to 23 at. % chromium and 2 to 20 at. % boron, and the nonferromagnetic spacer film 26 is preferably ruthenium (Ru).

Before the deposition of the first ferromagnetic film 24 of the AF-coupled magnetic layer 20, a very thin (typically 1 to 5 nm) Co alloy onset or nucleation layer 14 is typically deposited on the underlayer 13. The nucleation layer 14 has a composition selected to enhance the growth of the hexagonal close-packed (HCP) Co alloy of film 24 so that its C-axis is oriented in the plane of the layer. The nucleation layer 14 may be a CoCr alloy with a Cr composition selected so as to make the layer 14 nonferromagnetic or very slightly ferromagnetic. Alternatively, the nucleation layer 14 may be a ferromagnetic Co alloy, in which case the nucleation layer 14 will affect the magnetic properties of the film 24. If the film 24 is CoPtCrB, then the nucleation layer 14 may be CoPtCr or CoPtCrB with B less than 6 at. %. All of the layers described above from the seed layer 12 to the top ferromagnetic film 22 can be sputtered in a continuous process in either an in-line sputtering system or a single disk system, such as commercially available single disk systems with multiple sputtering target capacity. The sputter deposition of each of the layers can be accomplished using standard targets and techniques known to those in the field with the modifications described above.

The AF coupling of ferromagnetic films via a nonferromagnetic transition metal spacer film, like the structure of layer 20 in FIG. 1, has been extensively studied and described in the literature. In general, the exchange coupling oscillates from ferromagnetic to antiferromagnetic with increasing spacer film thickness. This oscillatory coupling relationship for selected material combinations is described by Parkin et al. in "Oscillations in Exchange Coupling and Magnetoresistance in Metallic Superlattice Structures: Co/Ru, Co/Cr and Fe/Cr", Phys. Rev. Lett. Vol. 64, p. 2034 (1990). The material combinations include ferromagnetic films made of Co, Fe, Ni, and their alloys, such as Ni—Fe, Ni—Co, and Fe—Co, and nonferromagnetic spacer films such as Ru, chromium (Cr), rhodium (Rh), iridium (Ir), copper (Cu), and their alloys. For each such material combination, the oscillatory exchange coupling relationship has to be determined, if not already known, so that the thickness of the nonferromagnetic spacer films is selected to assure antiferromagnetic coupling between the two ferromagnetic films. The period of oscillation depends on the nonferromagnetic spacer material, but the strength and phase of the oscillatory coupling also depends on the ferromagnetic material and interfacial quality. The oscillatory antiferromagnetic coupling of ferromagnetic films has been used in spin-valve type giant magnetoresistance (GMR) recording heads to design continuous magnetized antiferromagnetically coupled films whose magnetic moments are rigidly coupled together antiparallel during operation of the head. These type of spin-valve structures are described, for example, in IBM U.S. Pat. Nos. 5,408,377 and 5,465,185. The '185 patent describes a structure used in many commercially available spin-valve GMR heads, namely a laminated antiparallel pinned ferromagnetic layer having ferromagnetic films whose moments are rigidly coupled together and remain stationary during operation of the head. This type of magnetic structure of two ferromagnetic films antiferromagnetically coupled across a very thin nonferromagnetic spacer film, such as used in spin-valve heads and show in the AF-coupled magnetic layer 20 of FIG. 1, is also called a "synthetic antiferromagnetic". In the case where the structure has no net magnetic moment because the moments from the individual ferromagnetic films cancel, the structure can be called a "compensated" synthetic antiferromagnet.

For this AF-coupled structure of layer 20 the orientations of the magnetic moments 32, 34 of adjacent films 22, 24, respectively, are aligned antiparallel and thus add destructively. The arrows 32, 34 represent the moment orientations of individual magnetic domains that are directly above and below one another across the AF coupling film 26. In the absence of an applied magnetic field, when the bottom ferromagnetic film 24 is deposited onto the nucleating layer 14, it will have a granular structure with multiple adjacent grains being coupled together to form individual magnetic domains. In the absence of an applied magnetic field the moments of these domains in film 24 will be essentially randomly oriented. The spacer film or AF-coupling film 26 is then deposited to the correct thickness directly on ferromagnetic film 24. Next, the second or top ferromagnetic film 22 is deposited directly on the AF coupling film 26. As the grains of ferromagnetic film 22 grow they will form magnetic domains with moment orientations that are antiparallel to the moment orientations of ferromagnetic film 24 that are directly across the AF coupling film 26.

The type of ferromagnetic material and the thickness values $t_1$, $t_2$ of the ferromagnetic films 22, 24 are chosen so that the field strength above the disk at the height where the recording head is located is essentially equal for the two films. The Mrt for the layer 20 is given by $Mr_1t_1$-$Mr_2t_2$. In the preferred embodiment, $Mr_1t_1$ should be less than $Mr_2t_2$ because film 22 is closer to the head. This may be accomplished by using the same ferromagnetic materials in the two films 22, 24 and adjusting $t_1$ and $t_2$. If different ferromagnetic material compositions are used in the two films 22, 24 so that the magnetization (the magnetic moment per unit volume of material) of the two ferromagnetic films is made different, then the thicknesses are adjusted accordingly. In an alterative embodiment, the two films 22, 24 can be with $Mr_1t_1$=$Mr_2t_2$ so that the layer 20 has substantially zero net magnetic moment. In that case there would be some small field detected at the head because the upper film 22 is closer to the head.

While FIG. 1 is shown for a AF-coupled magnetic layer 20 with a two-film structure and a single spacer film, the invention is extendible to structures with multiple spacer films and multiple ferromagnetic films.

The nonferromagnetic spacer film 26 in FIG. 1 is a 0.6 nm Ru film. The Ru spacer film thickness was chosen to be at the first antiferromagnetic peak in the oscillatory coupling relationship. It may also be desirable for each of the CoPtCrB ferromagnetic films 22, 24 to include an interface film consisting essentially of 0.5 nm of Co at the interface with the Ru spacer film 26. These ultra-thin Co films increase the interfacial moment between the ferromagnetic films and the spacer film, resulting in enhanced antiferromagnetic coupling. However, antiferromagnetic exchange coupling will occur without incorporating the Co interface films in the CoPtCrB ferromagnetic films 22, 24.

After the AF-coupled magnetic layer 20 has been formed it is patterned to form discrete isolated magnetic regions separated from one another by "nonmagnetic" regions that produce essentially no magnetic field at the head. The discrete magnetic regions are sized to function as discrete magnetic domains or bits. This patterning is performed without the need for selective deposition or removal of the magnetic material. Regions of the AF-coupled layer 20 are transformed by ion irradiation from two ferromagnetic films AF-coupled across the Ru spacer film 26 to two ferromagnetic films that are ferromagnetically coupled so that their magnetic moments are parallel.

In the preferred patterning method, a stencil mask is irradiated with a dose of nitrogen ions (N+) and the ions are selectively transmitted through the holes in the mask. The ions pass through the holes in the mask and impact the AF-coupled layer 20 in selected regions corresponding to the pattern of the holes in the mask. The ions disrupt the interface between the Ru spacer film 26 and the ferromagnetic films 22, 24, and destroy the AF-coupling of the ferromagnetic films 22, 24. This occurs essentially without disturbing the magnetic properties of the ferromagnetic films 22, 24 and creates regions where the two ferromagnetic films are coupled together ferromagnetically with their magnetic moments oriented parallel. The regions not impacted by the N+ ions remain AF-coupled and thus have essentially no net magnetic moment as measured at the head. As a result the magnetic regions are separated from one another by "nonmagnetic" regions that have no magnetization. Thus the pattern of holes in the mask corresponds to the pattern of magnetic bit regions on the disk.

Figure 2:
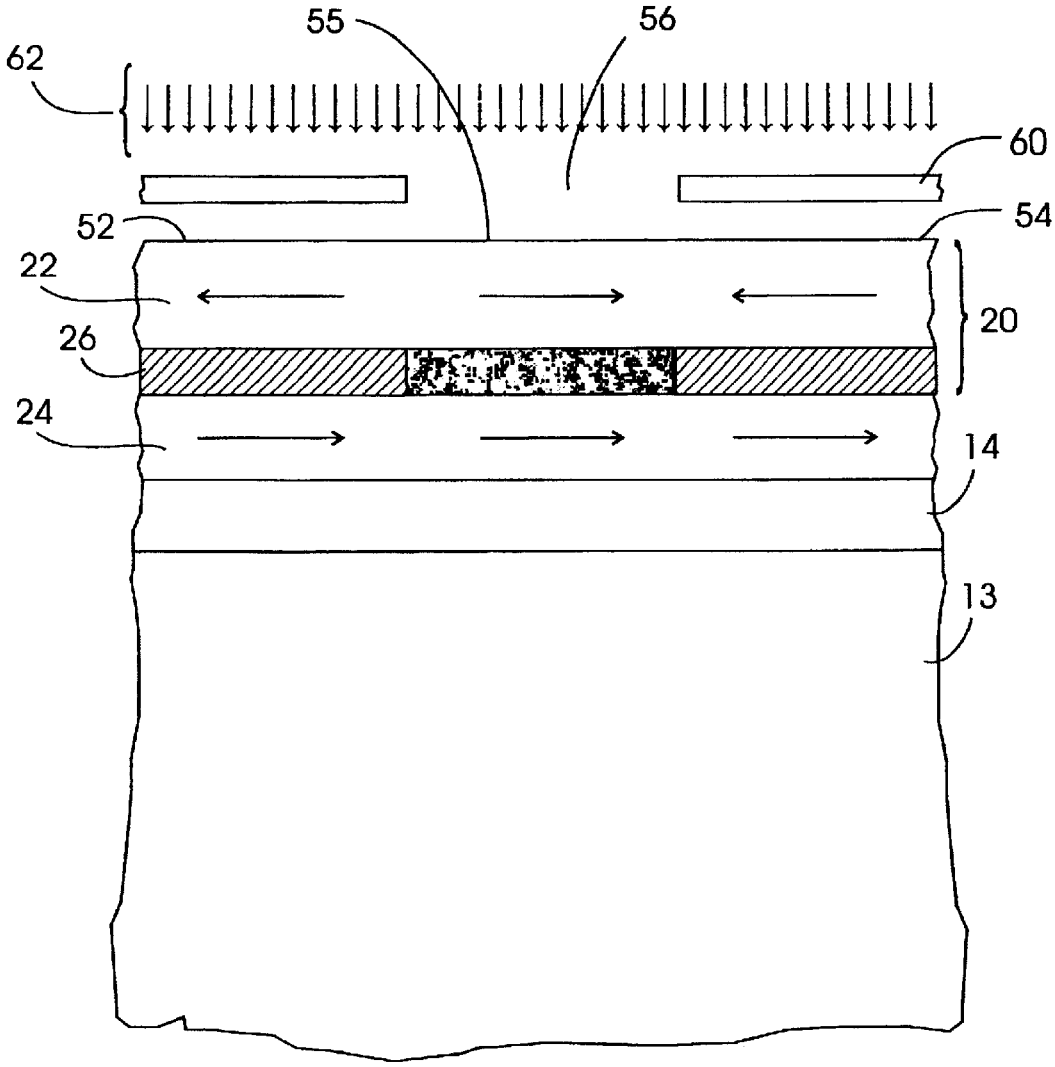
FIG. 2 is a schematic illustration of the process for patterning the AF-coupled layer by ion irradiation through a stencil mask.

FIG. 2 illustrates the patterning process schematically. The layer 20 remains AF-coupled across the spacer film (represented by cross-hatching of film 26) in the regions 52, 54 not aligned with a hole 56 in the silicon stencil mask 60. In the region 55 of layer 20 that is aligned with a hole 56 in mask 60, disordering of the interface between the Ru spacer film and the ferromagnetic films 22, 24 has occurred (as represented by the dotted area of film 26), and the magnetic moments of the two films 22, 24 become ferromagnetically coupled.

The stencil mask 60 is a non-contact mask that comprises a wafer, such as silicon, with holes etched through it. The ions, depicted by arrows 62, are transmitted through the holes in the wafer. The silicon stencil mask was fabricated from a commercial silicon-on-insulator (SOI) wafer with a 10 μm-thick top side silicon layer, 0.5 μm of SOI oxide, and a 500 μm-thick silicon carrier substrate. The stencil holes were first patterned by optical lithography and then transferred into the 10 μm-thick Si layer of $SF_6$-based, high aspect ratio reactive ion etching (RIE) with the SOI oxide serving as a reliable etch stop. Windows were then etched from the back side through the carrier substrate, using a similar RIE process, and the remaining SOI oxide was removed with a wet HF etch. The resulting silicon membrane is approximately 10 μm thick and covers an area of 1×1 mm. The holes in the membrane are nominally 1 μm in diameter, although somewhat irregular in shape, and are replicated throughout its area with a regular spacing of 1 to 10 μm. In making the patterned media two such stencil masks can be aligned with their holes overlapping to create holes with effective diameters in the range of 100 nm. However, it is possible to fabricate a single stencil mask in this manner, with much smaller holes in the sub-100 nm range, to produce patterned media with the desired areal density. A detailed description of the use of stencil masks for ion-beam patterning is described by B. D. Terris et al., "Ion-beam patterning of magnetic films using stencil masks", Appl. Phys. Lett., Vol. 75, No. 3, Jul. 19, 1999, which is incorporated herein by reference. In the preferred embodiment the mask has holes formed in a pattern to form a magnetic recording disk with concentric circular tracks, with each track having discrete magnetic regions spaced along it to serve as the individually recordable magnetic bits.

While nitrogen ions were used, other ion species that may be used include ions of He, Ar, Ne, Kr and Xe. The voltage and dosage of the ion irradiation required to achieve the desired disruption of the interface between the Ru spacer film 26 and the ferromagnetic films 22, 24 can be determined experimentally.

The preferred method for patterning the media with ion irradiation is by a non-contact mask, such as the silicon stencil mask described above. However, it is also possible to use conventional lithography, where a photoresist is formed on the AF-coupled layer and then patterned to expose openings aligned with portions of the layer intended to become the magnetic bit regions that are separated or isolated from the "nonmagnetic" regions.

After the AF-coupled layer has been patterned, a conventional protective overcoat (not shown in FIG. 1) can be formed over it to complete the fabrication of the patterned magnetic disk. The protective overcoat may be a typical overcoat of sputter deposited essentially amorphous carbon optionally doped with hydrogen and/or nitrogen. The overcoat is typically less than 15 nm thick.

Experimental Results

An AF-coupled structure of CoPtCrB/Co/Ru/Co/CoPtCrB was prepared on a 50 nm Cr metal substrate. The ferromagnetic films of CoPtCrB wer $Co_{68}Pt_{12}Cr_{20}$ alloy doped with 5 atomic percent (at. %) B. The lower CoPtCrB film was 10 nm thick and the upper CoPtCrB film was 5 nm. The two ferromagnetic films were interleaved with a Co(0.5 nm)/Ru(0.6 nm)/Co(0.5 nm) trilayer that coupled the CoPtCrB films antiferromagnetically so their moments were oriented antiparallel. The thickness of the CoPtCrB films was chosen such that there would be essentially zero magnetic filed at a predetermined distance above the magnetic layer. This distance is the height above the disk where the read head is located (i.e., the nominal flying height of the read head). Since the upper film 22 (see FIG. 1) is closer to the read head, the field from it will be higher than the field from the lower film 24. Thus the thickness of lower film 24 is made thicker to compensate and make the net field essentially zero at the head.

The magnetization of this structure was then measured with a Kerr looper over a range of external applied magnetic fields. A very high magnetic field (e.g., 8 kOe) sufficient to overcome the antiferromagnetic coupling of the two ferromagnetic films was first applied in the negative direction, and the Kerr data showed that the ferromagnetic films had their moments aligned parallel with the applied field direction. The field was then reduced and the Kerr data showed one of the ferromagnetic films switching magnetization direction, near the field strength that would correspond to the antiferromagnetic coupling field, so that the ferromagnetic films then had their moments aligned antiparallel. As the field passed through zero toward a positive applied field the ferromagnetic film moments remained antiparallel until the positive field exceeded the antiferromagnetic coupling field, at which point the ferromagnetic film moments became oriented parallel to one another and aligned with the positive applied field direction. Thus the Kerr data showed that this film structure is a synthetic antiferromagnet.

Next, this structure was bombarded with N+ ions at a dose of $2\times10^{16}$ ions/cm$^2$ at 700 ke V energy. When the structure was once again exposed to the same range of external applied field the Kerr data showed no AF-coupling of the ferromagnetic films. Instead the structure behaved like a single ferromagnetic layer, indicating that the ion bombardment had destroyed the antiferromagnetic coupling across the Ru spacer film. One can thus conclude that the ion bombardment had disrupted the interface between the Ru spacer film and the ferromagnetic films and intermixed the Ru with the adjacent ferromagnetic films. The structure had full remanence and a coercivity of about 1500 Oe.

Figure 3:
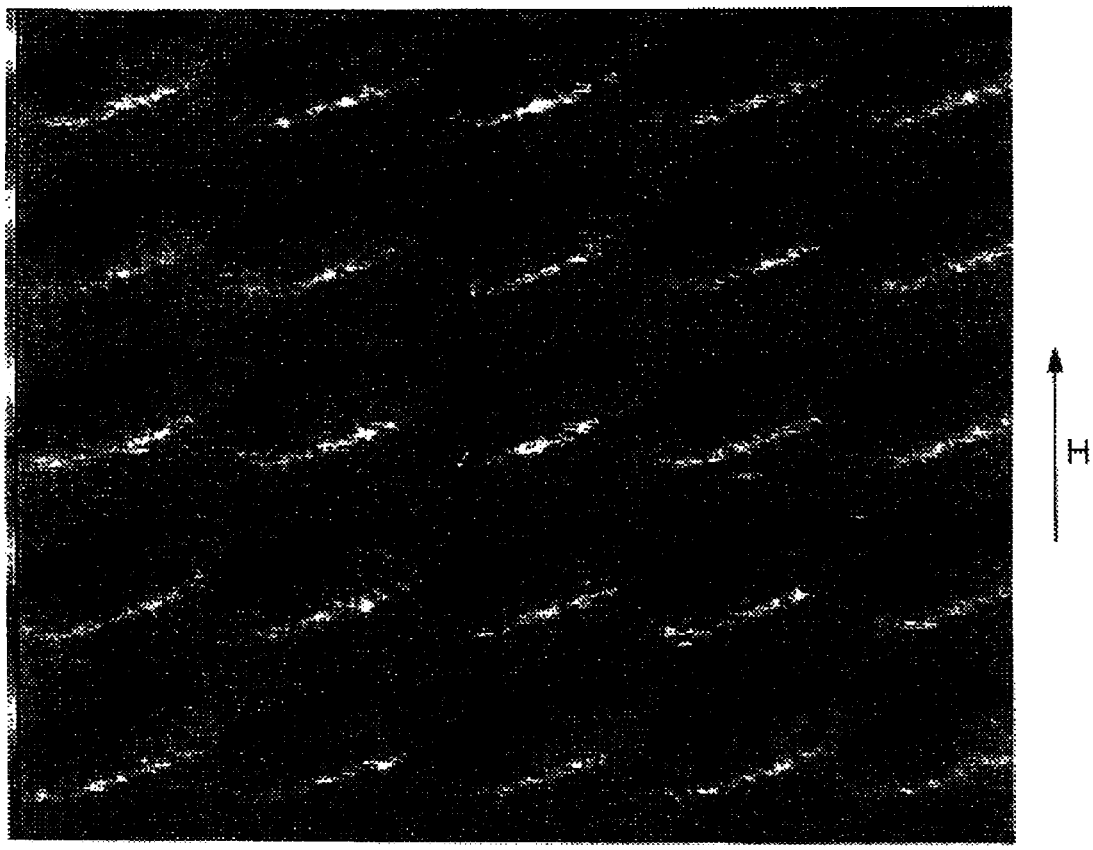
FIG. 3 is a magnetic force microscopy (MFM) image of the patterned AF-coupled layer showing discrete oblong-shaped magnetic regions.

Patterning of this same type of AF-coupled structure was then demonstrated using N+ ions. A 10 μm×10 μm area of this structure was exposed to a dose of $6\times10^{15}$ N+ ions/cm$^2$ through a Si stencil mask with micron size oblong-shaped holes. After patterning, the structure was first magnetized with a large magnetic field (20 kOe) in one direction. This field strength is sufficient to align the magnetization of the non-irradiated regions and to overcome the AF-coupling field in the non-irradiated regions so that the magnetizations of the ferromagnetic films in the non-irritated regions are aligned parallel to one another and to the applied field. This field was then removed, which caused the two ferromagnetic films in the non-irradiated regions to become AF-coupled. Next, a field of 2 kOe was applied in the opposite direction. This 2 kOe field is less than the AF-coupling field of the non-irradiated regions but large enough to switch the magnetization direction of the ferromagnetically coupled films in the irradiated regions only. FIG. 3 is a magnetic force microscopy (MFM) image of the patterned structure, with the oblong-shaped regions being the irradiated regions where the Ru spacer film in the structure was disrupted so that the ferromagnetic films in these oblong-shaped regions are ferromagnetically coupled. The light and dark contrast lines on the long edges of the oblong-shaped regions originate from magnetic transitions between the top (or bottom) ferromagnetic film in the non-irradiated AF-coupled regions and the ferromagnetically coupled films in the oblong-shaped irradiated regions.

Figure 4A:
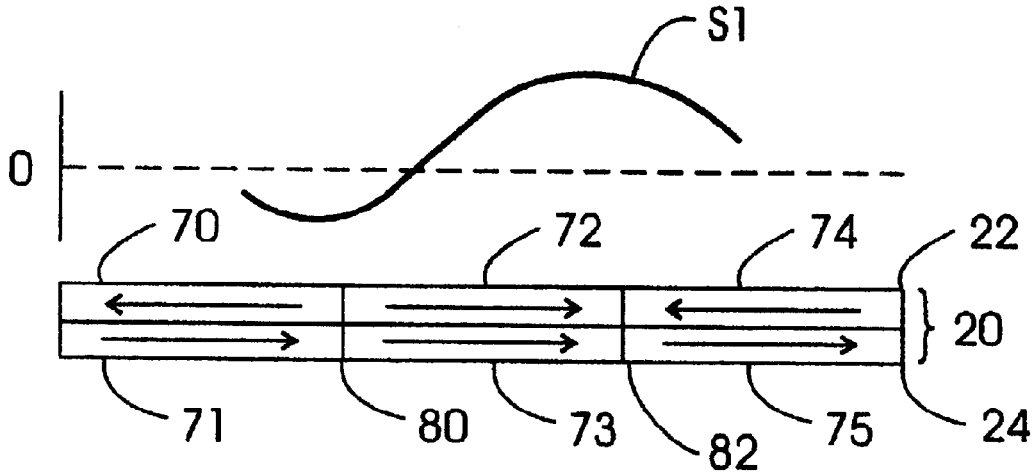
FIGS. 4A–4B are schematic views of the disk structure of the present invention showing different magnetic bit states with their corresponding signal profiles.
Figure 4B:
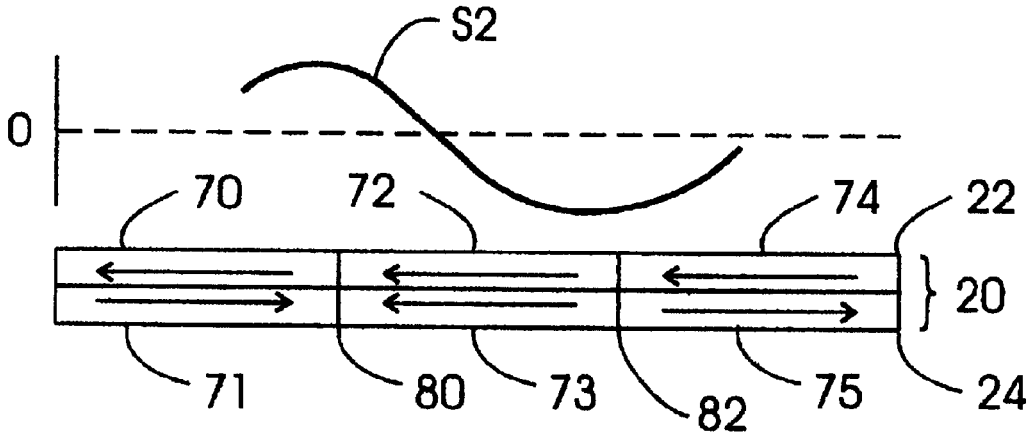

The two bit states in the recording media according to the present invention, wherein the magnetic field strength above the disk at the height where the recording head is located is essentially equal for the two films 24, 22, are depicted schematically in FIGS. 4A–4B. The magnetic transition regions are designated 80, 82. In FIG. 4A, only the transitions between the top film magnetic states, 70–72 and 72–74, contribute to the signal S1 because the bottom film magnetic states, 71–73 and 73–75, do not have magnetic transitions in the regions 80, 82. In FIG. 4B only the transitions between the bottom film magnetic states, 71–73 and 73–75, contribute to the signal S2 because the top film magnetic states, 70–72 and 72–74, do not have magnetic transitions in the regions 80, 82. In FIG. 4A the magnetization of the top ferromagnetic film 22 of the AF-coupled non-irritated regions 70, 74 are oppositely aligned with the magnetization in the ferromagnetic irradiated region 72–73, leading to a typical magnetic field profile as indicated by S1. This represents one written state, a "1". Conversely, the other written state, a "0", is accomplished by applying a field larger than the coercivity of the ferromagnetic regions 72–73 but smaller than the AF-coupling field between the top and bottom films 70–71 and 74–75 in the AF-coupled regions. In this way, only the ferromagnetic region 72–73 switches its magnetization and aligns parallel to the top films 70, 74. An inverted signal S2 is the result. The signals S1 (FIG. 4A) and S2 (FIG. 4B) depicted above the transition regions 80, 82 show that while the signs of the signals from the transitions are different, the amplitudes are the same, regardless of the directions of the transitions. This is because each of the ferromagnetic films 22, 24 is designed to have a magnetic moment so that the fields from the films, as detected at the head, are the same, even though film 22 is farther from the head.

If the alternative embodiment were used, where $Mr_1t_1 = Mr_2t_2$ so that the layer 20 has substantially zero net magnetic moment, then S1 and S2 would have different amplitudes. This is because the two films 22, 24 would then have the same magnetic moments, but film 24 is farther from the head. Thus the signal S2 from the transitions in lower film 24 would have a smaller amplitude than the signal S1.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A magnetic recording medium comprising:

a substrate;

a magnetic layer on the substrate and comprising a first ferromagnetic film, a second ferromagnetic film, and a nonferromagnetic film between the first and second ferromagnetic films; and wherein the magnetic layer [is] *has a plurality of concentric data tracks, each of the data tracks being* patterned *along the track* into first regions with the first and second ferromagnetic films being antiferromagnetically coupled across the nonferromagnetic film, and second regions with the first and second ferromagnetic films being ferromagnetically coupled, *the second regions being magnetically recordable data bits*.

2. The medium of claim 1 wherein the first ferromagnetic film in the first regions has a thickness t1 and a magnetization M1, the second ferromagnetic film in the first regions has a thickness t2 and a magnetization M2, and wherein the magnetic moment per unit area (M2×t2) is greater than the magnetic moment per unit area (M1×t1), whereby the magnetic field from the first regions is essentially zero at a predetermined distance above the magnetic layer.

3. The medium of claim 2 wherein the first and second ferromagnetic films are formed of substantially the same material, and wherein t2 is greater than t1.

4. The medium of claim 1 wherein the nonferromagnetic film is formed of a material selected from the group consisting of ruthenium (Ru), chromium (Cr), rhodium (Rh), iridium (Ir), copper (Cu), and their alloys.

5. The medium of claim 1 wherein the first and second ferromagnetic films are made of a material selected from the group consisting of Co, Fe, Ni, and their alloys.

6. [The medium of claim 1] *A magnetic recording medium comprising:*

*a substrate;*

*a magnetic layer on the substrate and comprising a first ferromagnetic film, a second ferromagnetic film, and a nonferromagnetic film between the first and second ferromagnetic films; and*

*wherein the magnetic layer is patterned into first regions with the first and second ferromagnetic films being antiferromagnetically coupled across the nonferromagnetic film, and second regions with the first and second ferromagnetic film being ferromagnetically coupled;* wherein the first ferromagnetic film includes an interface film consisting essentially of cobalt located at the interface of the first ferromagnetic film and the nonferromagnetic film.

7. [The medium of claim 1] *A magnetic recording medium comprising:*

*a substrate;*

*a magnetic layer on the substrate and comprising a first ferromagnetic film, a second ferromagnetic film, and a nonferromagnetic film between the first and second ferromagnetic films; and*

*wherein the magnetic layer is patterned into first regions with the first and second ferromagnetic films being antiferromagnetically coupled across the nonferromagnetic film, and second regions with the first and second ferromagnetic film being ferromagnetically coupled;* where the second ferromagnetic film includes an interface film consisting essentially of cobalt located at the interface of the second ferromagnetic film and the nonferromagnetic film.

8. The medium of claim 1 further comprising a nonferromagnetic underlayer located on the substrate between the substrate and the magnetic layer.

9. The medium of claim 1 further comprising a protective overcoat formed over the magnetic layer.

10. A magnetic recording disk comprising:

a substrate;

a nonferromagnetic underlayer on the substrate;

a magnetic recording layer on the underlayer and *having a plurality of concentric data tracks, the recording layer* comprising a first cobalt alloy ferromagnetic film, a nonferromagnetic spacer film of a material selected from the group consisting of ruthenium (Ru), chromium (Cr), rhodium (Rh), iridium (Ir), copper (Cu), and their alloys formed on and in contact with the first ferromagnetic film, and a second cobalt alloy ferromagnetic film formed on and in contact with the spacer film, *each of the data tracks on* the magnetic recording layer being patterned *along the track* into first regions wherein the spacer film has a thickness sufficient to induce the second ferromagnetic film to be exchange coupled antiferromagnetically to the first ferromagnetic film across the spacer film and second regions wherein the first and second ferromagnetic films are not antiferromagnetically coupled, whereby *each of* said second regions [produce] *produces* a magnetic field a predetermined distance above the magnetic layer that is greater than the magnetic field from *each of* said first regions, *the magnetic fields above the second regions representing the bits along the data track*; and a protective overcoat formed on the magnetic recording layer.

11. The disk of claim 10 wherein the first and second ferromagnetic films of the magnetic recording layer are formed of substantially the same material.

12. The disk of claim 10 wherein the first and second ferromagnetic films of the magnetic recording layer are made of a material selected from the group consisting of Co, Fe, Ni, and their alloys.

13. [The disk of claim 10] *A magnetic recording disk comprising:*

*a substrate;*

*a nonferromagnetic underlayer on the substrate;*

*a magnetic recording layer on the underlayer comprising a first cobalt alloy ferromagnetic film, a nonferromagnetic spacer film of a material selected from the group consisting of ruthenium (Ru), chromium (Cr), rhodium (Rh), iridium (Ir), copper (Cu) and their alloys formed on and in contact with the first ferromagnetic film, and a second cobalt alloy ferromagnetic film formed on and in contact with the spacer film, the magnetic recording layer being patterned into first regions wherein the spacer film having a thickness sufficient to induce the second ferromagnetic film to be exchange coupled antiferromagnetically to the first ferromagnetic film across the spacer film and second regions wherein the first and second ferromagnetic film are not antiferromagnetically coupled, whereby said second regions produce a magnetic field a predetermined distance above the magnetic layer that is greater than the magnetic field from said first regions; and*

*a protective overcoat formed on the magnetic recording layer;* wherein the first ferromagnetic film of the recording layer includes an interface film consisting essentially of cobalt located at the interface of the first ferromagnetic film and the spacer film.

14. [The disk of claim 10] *A magnetic recording disk comprising:*

*a substrate;*

*a nonferromagnetic underlayer on the substrate;*

*a magnetic recording layer on the underlayer comprising a first cobalt alloy ferromagnetic film, a nonferromagnetic spacer film of a material selected from the group consisting of ruthenium (Ru), chromium (Cr), rhodium (Rh), iridium (Ir), copper (Cu), and their alloys formed on and in contact with the first ferromagnetic film, and a second cobalt alloy ferromagnetic film formed on and in contact with the spacer film, the magnetic recording layer being patterned into first regions wherein the spacer film has a thickness sufficient to induce the second ferromagnetic film to be exchange coupled antiferromagnetically to the first ferromagnetic film across the spacer film and second regions wherein the first and second ferromagnetic films are not antiferromagnetically coupled, whereby said second regions produce a magnetic field a predetermined distance above the magnetic layer that is greater than the magnetic field from said first regions; and*

*a protective overcoat formed on the magnetic recording layer;* wherein the second ferromagnetic film of the recording layer includes an interface film consisting essentially of cobalt located at the interface of the second ferromagnetic film and the spacer film.

*15. The medium of claim 1 wherein the second regions are ion-irradiated regions.*

*16. The disk of claim 10 wherein the second regions are ion-irradiated regions.*

* * * * *